United States Patent [19]

Tassin de Montaigu

[11] 4,123,018
[45] Oct. 31, 1978

[54] HELICOPTERS WITH COAXIAL ROTORS, OF CONVERTIBLE TYPE IN PARTICULAR

[76] Inventor: Rene C. A. Tassin de Montaigu, 6, Square d'Orleans, Paris, France

[21] Appl. No.: 797,486

[22] Filed: May 16, 1977

Related U.S. Application Data

[63] Continuation of Ser. No. 648,535, Jan. 12, 1976, abandoned.

[51] Int. Cl.² ............................................. B64C 27/10
[52] U.S. Cl. ................................. 244/17.23; 244/83 F; 244/17.13; 416/40; 416/117; 416/130
[58] Field of Search ............... 244/17.13, 17.23, 7 R, 244/83 F, 7 A, 7 B, 17.11, 23 C, 82; 416/23, 40, 115, 117, 152, 130, 124, 127, 128, 129, 41, 24, 226

[56] References Cited

U.S. PATENT DOCUMENTS

| | | | |
|---|---|---|---|
| 612,511 | 10/1898 | Beck | 416/226 |
| 2,037,745 | 4/1936 | Vaughn | 416/128 |
| 2,382,460 | 8/1945 | Young | 244/7 B |
| 2,387,762 | 10/1945 | Leonard | 244/7 B |
| 2,444,781 | 7/1948 | Leonard | 244/7 B |
| 3,207,225 | 9/1965 | Shapiro | 416/115 |

Primary Examiner—Galen L. Barefoot
Attorney, Agent, or Firm—Charles Hieken

[57] ABSTRACT

The invention relates to improvements to helicopters with coaxial rotors, of convertible type in particular, consisting of at least two contra rotative rotors carrying blades for lifting and propelling, the fuselage having an axis parallel to the axes of the rotors and wherein each rotor consists of a nave carrying arms radially arranged, the arms carrying a coating with a propeller blade section, movable in incidence through whirling on to said arms. The naves are axially displaced along and rotatably supported about a shaft coaxial with the fuselage axis and comprising a structural support member of the fuselage.

13 Claims, 5 Drawing Figures

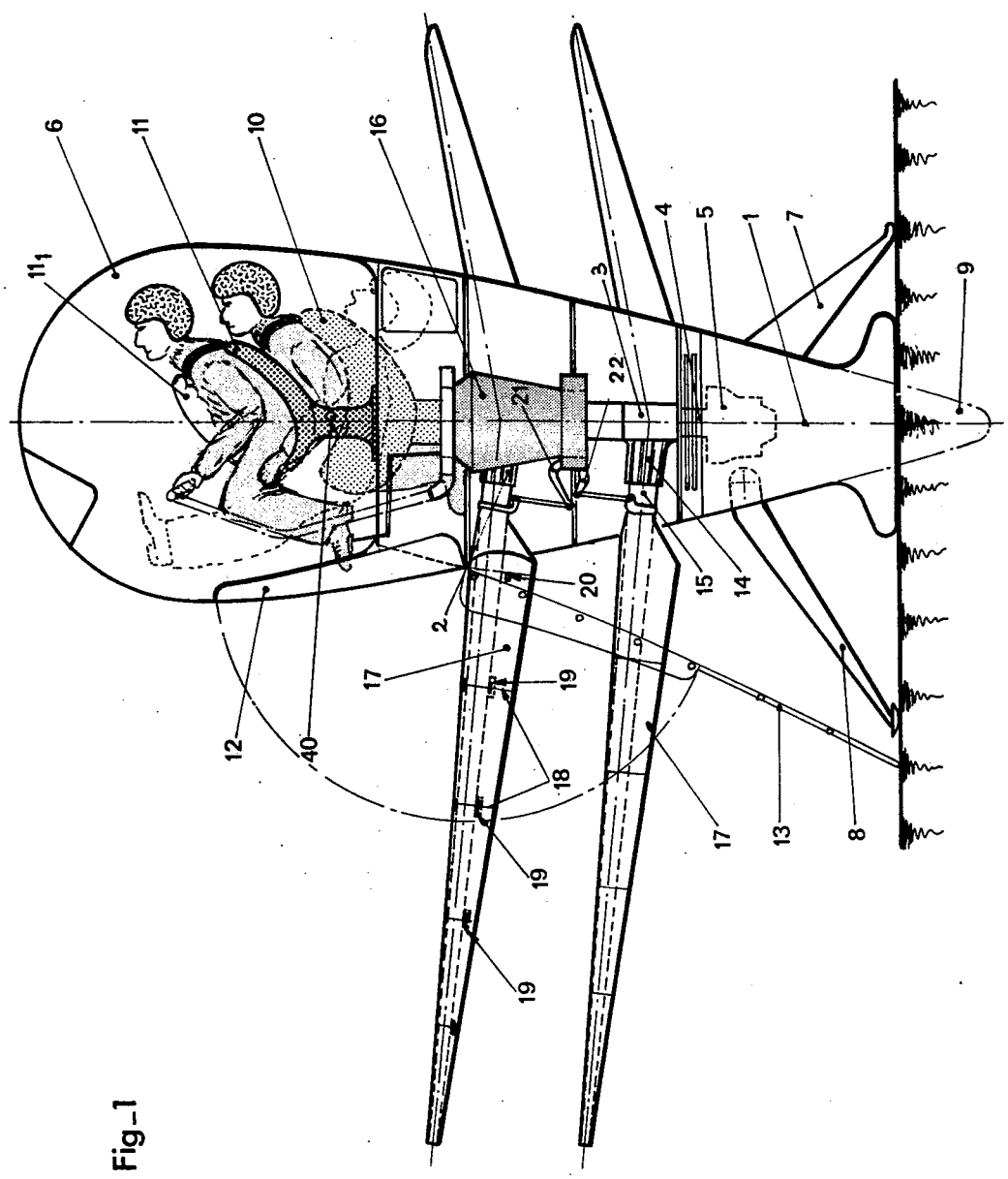
Fig_1

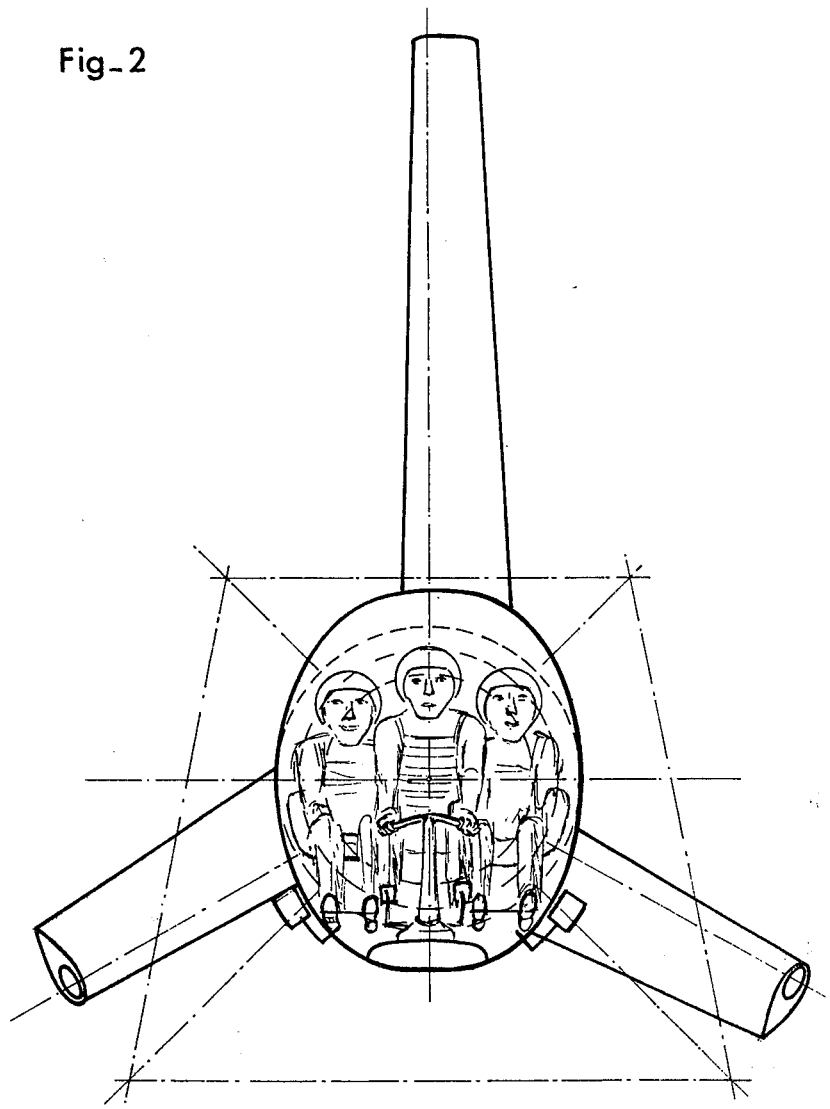
Fig_2

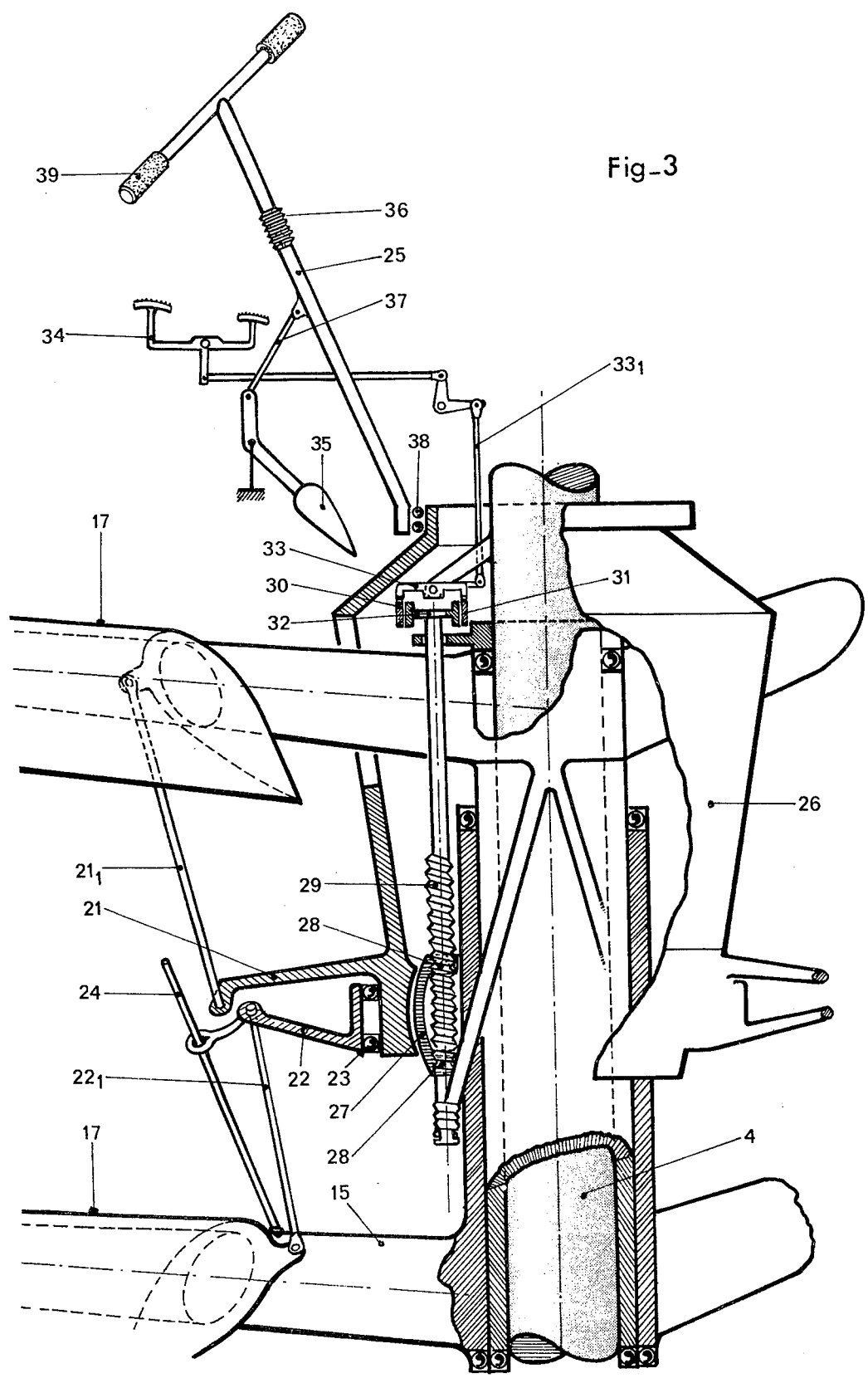
Fig_3

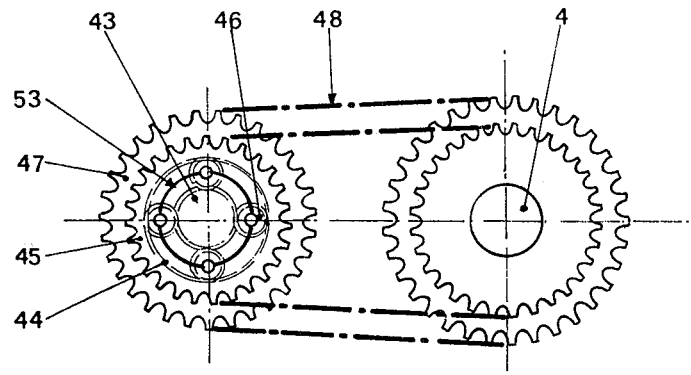
Fig_5
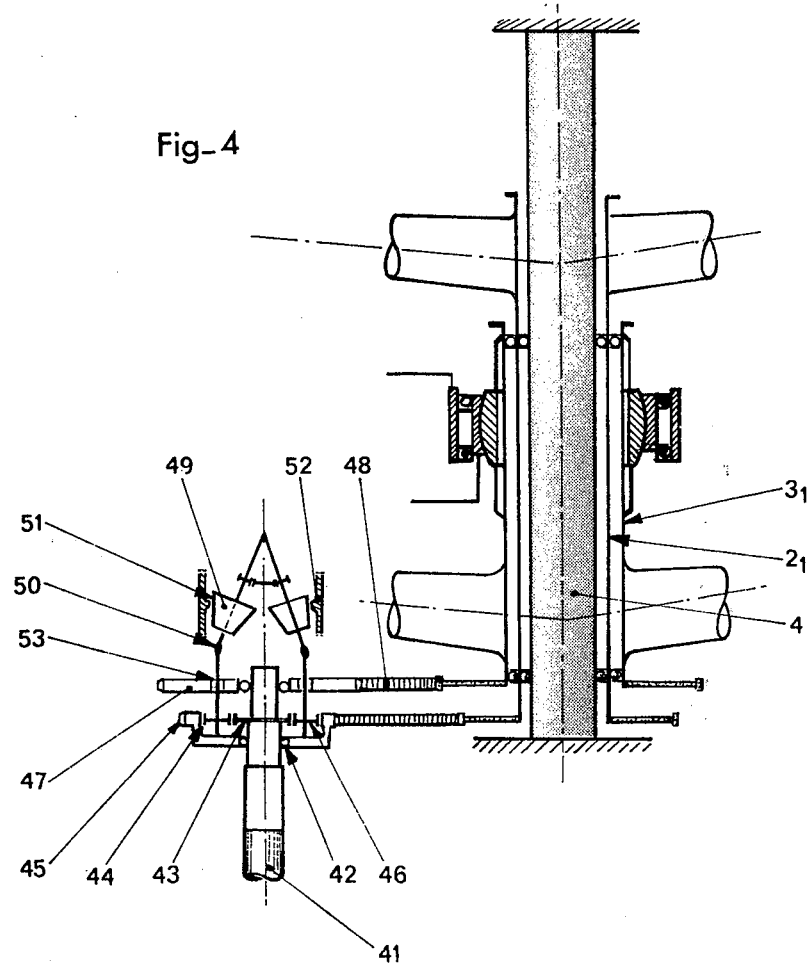
Fig_4

HELICOPTERS WITH COAXIAL ROTORS, OF CONVERTIBLE TYPE IN PARTICULAR

This is a continuation of application Ser. No. 648,535, filed Jan. 12, 1976, now abandoned.

The invention relates to improvements to helicopters with coaxial rotors, of convertible type in particular.

This type of helicopter carries at least two contra rotative rotors carrying blades for lifting and propelling, the fuselage thereof having an axis parallel to the axes of the rotors and rocking jointly with the latter.

According to a characteristic of the invention, said improvements are characterized in that each rotor consists of a nave carrying arms radially arranged, said arms being provided with a coating having a propeller blade section, movable in incidence through whirling on to said arms.

According to another characteristic of the invention, the axis of the fuselage is that of a shaft about which the naves of the rotors turn, and which constitutes the framework of the helicopter, any propulsive transmissions and flight control systems being external to said shaft, feeding means excepted.

According to another characteristic of the invention, the incidence of the coating of the blades is operated by two cyclic plates located between the rotors and each related to a rotor.

According to another characteristic of the invention, both cyclic plates are fitted revolving one of them outside the other, the inside plate being arranged on to a swivel-joint coaxial to the shaft and axially movable.

According to another characteristic of the invention, the contra rotative rotors are driven through a differential carrying a variation speed device constituting the control of rotation for the fuselage.

The invention is presented, by way of a non-limiting example, in the drawings attached herewith, in which:

FIG. 1 is a diagrammatical view of an helicopter according to the invention, when landing or taking off;

FIG. 2 is a view from above of FIG. 1;

FIG. 3 is a partly cut and extended view of the mechanism ensuring variation in the cyclic and general pitches;

FIG. 4 shows the means ensuring rotation of rotors and the means operating rotation of the fuselage through a variation device;

FIG. 5 is a diagrammatical view from the bottom of FIG. 4.

The helicopter provided by the invention consists of a fuselage, the general axis of which is shown at 1, and which carries two rotors 2 and 3, fitted revolving about shaft 4 and entailed into rotation by at least an engine 5.

This helicopter comprises a cockpit 6, substantially arranged along the axis of the fuselage and above the rotors, whilst the rear part thereof can be provided with one or two fixed rudders 7 serving as a tail-skid support, and with two fore-chassis legs 8 retractable rearwards.

The rear nose 9 of the helicopter, which terminates the fuselage can be, either flexible as shown in FIG. 1, or retractable, or again connected to both legs 7 and 8 of the chassis.

In said helicopter, passengers are seated on a bench 10 inclinable round the axis 40, whilst the pilot can preferably be seated on an automatic seat 11 having a back with a harness 11 and a movable pommel $11_1$, knee-caps, arm-rest, etc . . . , allowing him to be an integral part with the helicopter and leaving his arms and feet entirely free. The door 12 of the cockpit carries a ladder 13 likely to be retracted or fold up, thus providing an easy access to the cockpit.

The rotors according to the invention carry casings 14 having rigid arms substantially cylindrical 15 which extend up to the end of the blades, serving as longerons with a circular section. Said arms are connected to the casings with a connecting device carrying claws, screws or bayonets. The blade properly speaking simply consists of a coating 17 which transmits torsion only, and of groves 18 whirling on to the arms through dry bearings 19.

Such an arrangement, made possible thanks to the thickness of the blades, shows the advantage to ensure a great rigidity to the connection of the blade with the nave, and to prevent the presence of ball-bearings, incidence hinges, while reducing the incidence of the movable portion and all the more also reducing the centrifugal and inertia efforts suffered by the blade abutment 20 and the control means of incidence.

Said control means of incidence is more particularly shown in FIG. 3, wherein both cyclic plates 21 and 22 can be seen, said plates being arranged overlapping through a ball-bearing 23. The lower cyclic plate 22 is a driven by its rotor by means of a dog, such as 24, whilst it is connected to the coating 17 of the arms 15 of said rotor through a system of rods $22_1$.

Also, the upper cyclic plate 21 is entailed into rotation by the upper rotor, by means of mechanisms which will be explained hereafter, whilst said cylindrical plate is connected to the coating 17 of the upper rotor by the system of rods $21_1$.

The incliation of these plates is operated by the stick 25, through a bell 26. The upper plate 21, arranged inside the lower plate 22, is positioned on a swivel-joint 27, consisting for example of layers made of rolled iron and of elastomere arranged between the swivel-joint 27 proper and the internal plate 21. Said swivel-joint 27 is itself connected to bolts 28 arranged on threaded rods 29, so that the swivel-joint 27 can be axially removed and then, the cylindrical plates 21 and 22, by turning the threaded rods 29 in either ways.

The rotation of the threaded rods 29 is first synchronised by two small rings 30 and 31 which turn freely and are driven between the arms of the upper rotor by pinions 32. The axial displacement of the swivel-joint is then achieved from the pedal 34 of the collective pitch drive which operates the brake 33 through a system of rods $33_1$ selectively acting on either rings 30 and 31, so as to brake them and to make the threaded rods 29 turn accordingly in either ways, depending on the ring which is braked.

Such an arrangement, which locks the efforts of the collective pitch on to the rotors themselves, releases all the rest of the cyclic drive kinematic, in particular the ball-bearing 38 which, in view of the lightness of the blade coatings and the small value of the cyclic variation required to pilot the rigid rotors, provides a light and very smooth drive.

Said lightness makes it possible to use a single aerodynamic speed and direction anemometer 35, arranged in parallel or in series inside the depth control column (stick 25), so as to stabilize the flight phases during which the rigid rotor is usually unstable. As a matter of fact, it is known that whatever rigid fitting of the arms on to the naves, the residual flexibility causes a static unstability of the position of the apparatus, in particular when the helicopter is flying at high speed (Report from the National Technical Information Service, U.S. Dept. of Commerce No. A.D. 734,338). On the other hand, such a rigid fitting makes the apparatus enjoy an absorption couple in position angular speed particularly strong and favorable.

Adding the speed and direction anemometer 35, acting along one or two axes, makes it possible to keep said absorption by preventing any longitudinal and/or lateral unstability from occurring. In the description of the fitting in parallel shown in FIG. 3, the speed and direction anemometer 35 tends to set parallel to the direction of the relative wind, so that a change in the position of the apparatus, for example during a nose-lift thereof, causes an effort on to the speed and direction anemometer 35 which acts in the nose-dive way. The handle-bar 39 for the pilot is connected to the stick 25 by a flexible part 36, which allows the speed and direction anemometer to act independently from the pilot action. Adjusting the length of the rod 37 may serve as a trim (cancellation of the forces of reaction initiated by the blades on the direction control stick). Thus, such a fitting in parallel add the efforts of the pilot and of the speed and direction anemometer together. However, it is also possible to provide a fitting in series which would add displacements together.

FIGS. 4 and 5 show the differential driving of the rotors from engines such as 5, and also the variation speed device which serves to control the rotation of the fuselage.

The engine 41, which entails the shafts of the rotors 2 and 3 into rotation, first entails through a clutch device and a free wheel 42, a small epicycloidal reducer with spur pinions, and causes rotation in the opposite way of the satellite-carrier, on the one hand, and of the ring 44, on the other, each of said both parts being respectively connected to the naves $3_1$ and $2_1$ of the rotors, through, either chains 48 and pinions 45, 47, or single gears.

By suitably selecting the reduction ratio between these various elements (the relative ratio of the reductions of both chains must only be contrary to those of the ring 44 and of the satellite-carrier 53), it is thus obtained equality in the couples transmitted to each rotor. Such a differential transmission results in a proportional connection between the normal running of the engine and the algebric difference between the normal running of both rotors; the algebric sum remains undetermined and each rotor automatically adapts its own speed so as to balance the engine-couple thus applied to it, and also the resistant couple opposed to it by the air, without transmitting any reaction to the fuselage.

The control device of the rotation of the fuselage consists of a small variation speed device connected to the epicycloidal reducer. The satellites 46 of the epicycloidal reducer carry slightly cone-shaped rollers 49, driven by the satellites through a flexible element made of elastomere 50. The axis of said rollers is slightly oblique in relation to that of the reducer, so that their external surfaces 51 have a constant diameter in relation to the axis of the reducer and can rub onto a ring 52 axially operated by the rotation of the pilot handle-bar 39, through, for example, a connection with a cable, not shown. Depending on said axial position, the algebric sum of the normal running of the rotors will be fixed to a value slightly positive or negative, just as the pilot could wish, causing the fuselage moving to the right or the left. The great inertia and speed of rotation of the rotors compared with the small inertia and speed of rotation of the fuselage will ensure to said rotation drive very great qualities of efficiency, absorption and lineal, as well.

The pilot will see the flight control systems such as follows:

At his feet, the general pitch pedal 34 of a gas-control (not shown), possibly carrying a centrifugal readjustment device for the normal running of the rotors.

At his hands, a handle-bar 39 likely to be moved by:
pushing down or pulling it up for depth purposes,
inclining it at the left or right hands for inclination purposes,
turning it at the left or right hands for rotation purposes.

In the present case where the fuselage rocks with the apparatus, said control systems correspond in any flight whatever to identical actions seen and felt by the pilot, which prevent complicated combinations of convertible apparatus, the very notions of functioning and direction are automatically replaced by those of inclination and rotation.

Of course, the invention is not limited to the example of embodiment described and depicted hereabove, from which other modes and methods of embodiment can be provided without thereby departing from the scope of the invention.

What we claim is:

1. Improvements to helicopters with coaxial rotors of convertible type in particular, consisting of at least two contra rotative rotors carrying blades having a coating for lifting and propelling, the fuselage having an axis common with the axes of the rotors and rocking jointly with the latter between substantially vertical and horizontal positions, improvements wherein each rotor consists of a nave carrying blades radially arranged, and said blades being movable in incidence and cyclically controlled and further comprising,
    a shaft coaxial with said fuselage axis inside said fuselage forming a structural member of said fuselage,
    and means for supporting the rotor naves axially displaced along and rotatable about said shaft,
    said helicopter being free of fixed wings with said rotors being the sole means for providing lift when said fuselage is vertical and horizontal in flight,
    propulsive transmissions and flight control systems external to said shaft,
    engine means axially displaced from said shaft inside said fuselage embracing the common axis of said shaft and fuselage coupled to said propulsive transmission for providing driving power to said rotors,
    wherein the incidence of the blades coating is driven by two cyclic plates located between the rotors and related to each of said rotors.

2. Improvements according to claim 1, wherein the two cyclic plates are fitted rotating one of them inside the other, the internal plate being arranged on a swivel-joint coaxial to the fuselage and movable axially.

3. Improvements according to claim 1, wherein the contra rotative rotors are driven through a differential carrying a variation speed device constituting the control of the rotation of the fuselage.

4. Improvements according to claim 1 wherein each nave of each rotor carries rigid arms radially arranged, said arms being provided with a coating with a propeller blade section, movable in incidence, through whirling onto said arms.

5. Improvements according to claim 4 wherein each rotor has blades with each blade having a rigid central member extending substantially the full length of the blade surrounded by said coating and having means for relatively displacing said coating about said member as said rotors rotate for varying collective and cyclic pitch of the rotors.

6. Improvements according to claim 1 wherein said rotors are the sole means for propulsion and control.

7. Improvements according to claim 1 wherein said rotors are alike.

8. Improvements according to claim 1 wherein said means for supporting the rotor naves comprises first and second nave ball bearings coaxially mounted on said first and second naves respectively and rotatable about said shaft and further comprising, means for driving the rotor naves contra rotatively,
said rotors being mounted rigidly on a respective nave and located axially along said shift in the vicinity of the gravity center of said helicopter.

9. Improvements to helicopters with coaxial rotors of convertible type in particular, consisting of at least two contra rotative rotors carrying blades for lifting and propelling, the fuselage having an axis common with the axes of the rotors and rocking jointly with the latter wherein each rotor consists of a nave carrying arms radially arranged, said arms being provided with a coating with a propeller blade section, movable in incidence through whirling on to said arms, a shaft coaxial with said fuselage axis inside said fuselage forming a structural member of said fuselage,
means for supporting the rotor naves axially displaced along and rotatable about said shaft,
wherein the incidence of the blades coating is driven by two cyclic plates located between the rotors and related to each of said rotors with the two cyclic plates being fitted rotating one of them inside the other, the internal plate being arranged on a swivel-joint coaxial to the shaft and movable axially and is integral with a bell connected to the handle-bar of the helicopter by a ball-bearing for simultaneously driving the two cyclic plates.

10. Improvements according to claim 9, wherein the cyclic control handle-bar acting onto the bell carries a stabilizing speed and direction anemometer.

11. Improvements to helicopters with coaxial rotors of convertible type in particular, consisting of at least two contra rotative rotors carrying blades for lifting and propelling, the fuselage having an axis common with the axes of the rotors and rocking jointly with the latter wherein each rotor consists of a nave carrying arms radially arranged, said arms being provided with a coating with a propeller blade section, movable in incidence through whirling on to said arms, a shaft coaxial with said fuselage axis inside said fuselage forming a structural member of said fuselage,
means for supporting the rotor naves axially displaced along and rotatable about said shaft,
wherein the incidence of the blades coating is driven by two cyclic plates located between the rotors and related to each of said rotors with the two cyclic plates being fitted rotating one of them inside the other, the internal plate being arranged on a swivel-joint coaxial to the shaft and movable axially and the axial displacement of the swivel-joint for driving the collective pitch is driven from the motion of the rotors.

12. Improvements according to claim 11, wherein the swivel-joint is integral in rotation with one of the rotors and secured by means of screws, themeselves integral with the rollers, said rollers internally and externally engaging rings turning freely, said rings selectively co-operating with braking means.

13. Improvements to helicopters with coaxial rotors of convertible type in particular, consisting of at least two contra rotative rotors carrying blades for lifting and propelling, the fuselage having an axis common with the axes of the rotors and rocking jointly with the latter between substantially vertical and horizontal positions, improvements wherein each rotor consists of a nave carrying blades radially arranged, said blades being movable in incidence and cyclically controlled and further comprising, a shaft coaxial with said fuselage axis inside said fuselage forming a structural member of said fuselage,
and means for supporting the rotor naves axially displaced along and rotatable about said shaft,
said rotors being the sole means for providing lift when said fuselage is vertical and horizontal in flight and,
means for increasing the angular velocity of one of said rotors while decreasing the angular velocity of the other rotor to alter the differential velocity therebetween without substantially increasing the energy dissipated for controlling the rotation of the fuselage.

* * * * *